United States Patent

[11] 3,621,017

| [72] | Inventors | Adolf Zeidler |
| | | Ludwigshafen/Rhine; |
| | | Karl-Heinz Koenig, Ludwigshafen/Rhine; |
| | | Adolf Fischer, Mutterstadt/Upper Palatinate; Johann Jung, Limburgerhof/Upper Palatinate, all of Germany |
| [21] | Appl. No. | 761,874 |
| [22] | Filed | Sept. 23, 1968 |
| [45] | Patented | Nov. 16, 1971 |
| [73] | Assignee | Badische Anilin- & Soda-Fabrik Aktiengesellschaft Ludwigshafen/Rhine, Germany |
| [32] | Priority | Sept. 30, 1967 |
| [33] | | Germany |
| [31] | | P 16 70 275.3 |

[54] SALTS OF THIADIAZINONES
1 Claim, No Drawings

[52] U.S. Cl. ............................................. 260/243 R, 71/91
[51] Int. Cl. ................................................ C07d 93/30
[50] Field of Search .................................... 260/243, 243 R

[56] References Cited
UNITED STATES PATENTS
3,041,336  6/1962  Teufel ........................... 260/243
3,278,532  10/1966  Houlihan ....................... 260/243

Primary Examiner—John M. Ford
Attorney—Johnston, Root, O'Keeffe, Keil, Thompson & Shurtleff

ABSTRACT: Valuable new salts of thiadiazinones, especially substituted ammonium salts of benzo-2,1,3-thiadiazinone-(4)-2,2-dioxides and a process for regulation of plant growth with these compounds.

SALTS OF THIADIAZINONES

The present invention relates to valuable new salts of thiadiazinones and growth regulators containing them having simultaneous herbicidal action as well as a process for the application of these salts.

It is known that 2-chloroethyl trimethyl ammonium chloride (CCC) may be used for regulating the growth height of spring and winter wheat while thickening at the same time the stalk, thus effecting an improvement in the resistance to lodging of the stalks. However, 2-chloroethyl trimethyl ammonium chloride does not exert any influence on weeds and there is the danger that these will overrun the wheat. Therefore the simultaneous application of CCC and herbicides is indispensable for efficient wheat cultivation. Mixtures of 2-chloroethyl trimethyl ammonium chloride and herbicides can, however, only be produced immediately before their use and are not storable (J. Stryckers u. M. Van Himme, Mededelingen Rijksfaculteit Landbouwwetenschappen, Ghent, 31 (1966) No. 3, pages 1,132 and 1,154) and it is uneconomical to apply them separately.

An object of the invention is to provide valuable new salts of benzo-2,1,3-thiadiazinone-(4)-2,2-dioxides.

A further object of the invention is to provide a process for the regulation of plant growth, in particular for the regulation of the growth height of crop plants while combating unwanted plants without damaging the crop plants.

These and other objects of the invention are achieved with salts of benzo-2,1,3-thiadiazinone-(4)-2,2-dioxides having the formula

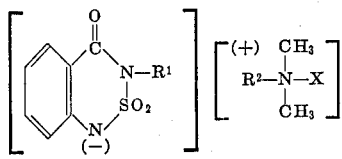

in which $R^1$ denotes a lower aliphatic radical or a cycloalkyl radical, $R^2$ denotes a β-haloethyl, an isopropyl, a sec-butyl, an alkyl or a 2-chloroallyl radical and X denotes a methyl or an amino group. These salts reduce, as does 2-chloroethyl trimethyl ammonium chloride, the growth height of wheat and barley, but have at the same time a good herbicidal action against dicotyledonous weeds, especially camomile.

Examples of active ingredients in accordance with this invention are the 2-chloroethyl trimethyl ammonium salts of 3-methyl-benzo-2,1,3-thiadiazinone-(4)-2,2-dioxide, 3-ethyl-benzo-2,1,3-thiadiazinone-(4)-2,2-dioxide, 3-n-propyl-benzo-2,1,3-thiadiazinone-(4)-2,2-dioxide, 3-isopropyl-benzo-2,1,3-thiadiazinone-(4)-2,2-dioxide, 3-n-butyl-benzo-2,1,3-thiadiazinone-(4)-2,2-dioxide, 3-isobutyl-benzo-2,1,3-thiadiazinone-(4)-2,2-dioxide, 3-sec-butyl-benzo-2,1,3-(4)-2,2-dioxide and 3-cyclohexyl-benzo-2,1,3-thiadiazinone-(4)-2,2-dioxide and the N-2-chloroethyl-N,N-dimethyl hydrazonium salts of 3-methyl-benzo-2,1,3-thiadiazinone-(4)-2,2-dioxide, 3-ethyl-benzo-2,1,3-thiadiazinone-(4)-2,2-dioxide, 3-n-propyl-benzo-2,1,3-thiadiazinone-(4)-2,2-dioxide, 3-n-isopropyl-benzo-2,1,3-thiadiazinone-(4)-2,2-dioxide, 3-n-butyl-benzo-2,1,3-thiadiazinone-(4)-2,2-dioxide, 3-isobutyl-benzo-2,1,3-thiadiazinone-(4)-2,2-dioxide, 3-sec-butyl-benzo-2,1,3-thiadiazinone-(4)-2,2-dioxide and 3-cyclohexyl-benzo-2,1,3-thiadiazinone-(4)-2,2-dioxide and mixtures of these salts.

The active ingredients according to the invention are new. They may, for example, be prepared in a simple manner by reacting the alkali metal salts of the corresponding benzo-2,1,3-thiadiazinone-(4)-2,2-dioxides with substituted trimethyl ammonium salts or with substituted N,N-dimethyl hydrazonium salts. The preparation of the 2-chloroethyl trimethyl ammonium salt of 3-n-propyl-benzo-2,1,3-thiadiazinone-(4)-2,2-dioxide is described here in detail, as all the compounds according to the invention may be prepared analogously.

26 parts by weight of the sodium salt of 3-n-propyl-benzo-2,1,3-thiadiazinone-(4)-2,2-dioxide is dissolved in 200 parts of methanol. A solution of 13.5 parts of 2-chloroethyl trimethyl ammonium chloride in 100 parts of methanol is allowed to flow into this solution at room temperature. To complete the reaction this mixture is stirred for 3 hours at 60° C. The reaction mixture is allowed to cool, the deposited sodium chloride is separated by suction filtration and the filtrate is evaporated to dryness in a water jet vacuum. 36.2 parts of a white crystalline salt is obtained, which dissolves in water hydrolyses to give a clear solution.

Analysis: $C_{15}H_{24}ClN_3O_3S$ (361.9)
calc. Cl. 9.80, N 11.61, S 8.86
found Cl. 9.7, N 11.5, S 8.8

The compounds to be used in accordance with this invention are colorless, crystalline salts which dissolve in water without being decomposed.

The thiadiazinone compounds required as starting products for the production of the compounds according to the invention may be prepared in a simple manner by cyclization of N-alkyl-N'-o-carboxyphenylsulfamides or N-alkyl-N'-o-carboalkoxyphenylsulfamides by means of condensing agents. Examples of condensing agents which may be used are phosphoroxy chloride, thionyl chloride or aqueous or alcoholic alkali metal solutions.

3-propyl-benzo-2-thia-1,3-diazinone-(4)-2,2-dioxide 27.2 parts by weight of N-propyl-N'-o-carbomethoxyphenylsulfamide is dissolved in 200 parts by weight of methanol. After the addition of 100 parts of 10 percent (by weight) aqueous caustic soda solution, the whole is boiled for a short time and then the still hot solution is acidified to pH 1 with concentrated hydrochloric acid. After having been allowed to cool, 22.8 parts of 3-propyl-benzo-2-thia-1,3-diazinone-(4)-2,2-dioxide (white crystals having a melting point of 191° to 192° C.) is obtained, i.e. 95 percent of the theoretical yield. No further purification of the substance is necessary.

By reacting the compounds obtained in this manner with sodium methylate in methanolic solution and subsequent evaporation in vacuo of the methanol, the corresponding sodium salt is obtained. For example, the sodium salt of 3-n-propyl-benzo-2-thia-1,3-diazinone-(4)-2,2-dioxide is obtained in this manner from 3-n-propyl-benzo-2-thia-1,3-diazinone-(4)-2,2-dioxide.

The substances in accordance with this invention may be applied in the form of aqueous solutions, as emulsions, suspensions or dusts. They may be mixed with fertilizers. In any case a fine distribution of the active ingredient should be ensured.

The growth regulators are produced by mixing the active ingredients with solid or liquid carriers (oils, water, talc, fertilizers, diatomaceous earth).

The following examples demonstrate the superior action of the active ingredients according to this invention over the individual components or simple (physical) mixtures of them.

EXAMPLE 1

In a greenhouse, the plants: wheat (types opal and Koga II) (Triticum vulgare), camomile (Matricaria chamomilla), cleavers (Galium aparine), white goosefoot (Chenopodium album), lady's thumb (Polygonum persicaria), small nettle (Urtica urens) are treated at a growth height of 2 to 10 cm. (wheat, first to second leaf, 10 cm. high) with 2 kg. per hectare of the 2-chloroethyl trimethyl ammonium salt of 3-ethyl-benzo-2,1,3-thiadiazinone-(4)-2,2-dioxide (I), with a mixture of 1.23 kg. per hectare of 3-ethylbenzo-2,1,3-thiadiazinone-(4)-2,2-dioxide+0.93 kg. per hectare of 2-chloroethyl trimethyl ammonium chloride (II), with 1.23 kg. per hectare and 2 kg. per hectare of 3-ethyl-benzo-2-thia-1,3-diazinone-(4)-2,2-dioxide (III), and with 0.93 kg. per hectare and 2 kg. per hectare of 2-chloroethyl trimethyl ammonium chloride (IV), the amounts of the active ingredients being dissolved in each case in 600 liters of water per hectare.

The herbicidal action is checked after 4 weeks and the height of the wheat measured in cm. It is ascertained that the 2-chloroethyl trimethyl ammonium salt of 3-ethylbenzo-2-thia-1,3-diazinone-(4)-2,2-dioxide (I) inhibits the growth of wheat while at the same time having a good herbicidal action. Mixture II, consisting of 3-ethyl-benzo-2-thia-1,3-diazinone-(4)-2,2-dioxide and 2-chloroethyl trimethyl ammonium chloride, has an action inferior to active ingredient I.

3-ethyl-benzo-2-thia-1,3-diazinone-(4)-2,2-dioxide (III) does not inhibit the growth of the wheat, whereas the compound 2-chloroethyl trimethyl ammonium chloride (IV) has no herbicidal action. The results of the experiment may be seen in the following table:

|  | Control (untreated) | Active ingredient | | | | | |
|---|---|---|---|---|---|---|---|
|  |  | I | II | III | | IV | |
| Application rate, kg./ha | 0 | 2 | 1.23 III, +0.93 IV | 1.23 | 2 | 0.93 | 2 |
| Crop plants: | | | | | | | |
| Wheat (opal), cm | 21 | 16 | 18 | 21 | 20–21 | 17–18 | 16–17 |
| Wheat (koga II), cm | 21 | 16–17 | 19 | 21 | 20–21 | 18 | 16–17 |
| Weeds: | | | | | | | |
| Camomile | 0 | 100 | 80 | 70–80 | 100 | 10 | 20 |
| Cleavers | 0 | 70–80 | 60–70 | 60–70 | 70–80 | 0 | 10 |
| White goosefoot | 0 | 90–100 | 80 | 70–80 | 90–100 | 0 | 10–20 |
| Lady's thumb | 0 | 70–80 | 60 | 60 | 70–80 | 10 | 20 |
| Small nettle | 0 | 100 | 80–90 | 80–90 | 90–100 | 10–20 | 20–30 |

NOTES:
100=total destruction of weeds; 0=no damage to weeds. The height of the wheat was measured in cm. In all cases the herbicidal damage to the wheat was 0.

The following have the same biological action as I: the 2-chloroethyl trimethyl ammonium salt of
3-methyl-benzo-2,1,3-thiadiazinone-(4)-2,2-dioxide the 2-chloroethyl trimethyl ammonium salt of
3-propyl-benzo-2,1,3-thiadiazinone-(4)-2,2-dioxide the 2-chloroethyl trimethyl ammonium salt of
3-isopropyl-benzo-2,1,3-thiadiazinone-(4)-2,2-dioxide the N,N-dimethyl-N-(β-chloroethyl)-hydrazonium salt of
3-ethyl-benzo-2,1,3-thiadiazinone-(4)-2,2-dioxide the N,N-dimethyl-N-(β-chloroethyl)-hydrazonium salt of
3-methyl-benzo-2,1,3-thiadiazinone-(4)-2,2-dioxide the N,N-dimethyl-N-(β-chloroethyl)-hydrazonium salt of
3-propyl-2,1,3-thiadiazinone-(4)-2,2-dioxide the N,N-dimethyl-N-(β-chloroethyl)-hydrazonium salt of
3-isopropyl-2,1,3-thiadiazinone-(4)-2,2-dioxide the N,N-dimethyl-N-(β-chloroethyl)-hydrazonium salt of
3-butyl-benzo-2,1,3-thiadiazinone-(4)-2,2-dioxide.

EXAMPLE 2

Wheat plants of the type "Heines Koga" and barley plants of the type "Breuns Wisa" are grown in glass dishes in a sandy loamy soil with the provision of nutrients and with the addition of 3 and 12 mg. respectively of the new active ingredients. The active ingredients: the 2-chloroethyl trimethyl ammonium salt of 3-methyl-benzo-2,1,3-thiadiazinone-(4)-2,2-dioxide (I); the 2-chloroethyl trimethyl ammonium salt of 3-ethyl-benzo-2,1,3-thiadiazinone-(4)-2,2-dioxide (II); the 2-chloroethyl trimethyl ammonium salt of 3-propyl-benzo-2,1,3-thiadiazinone-(4)-2,2-dioxide (III) are sprayed in aqueous solution on to the surface of the soil immediately after sowing. As well as untreated controls, 2-chloroethyl trimethyl ammonium chloride=CCC is included in the experiments as a comparative substance.

In comparison with the control, the treated plants already reveal a reduced growth height a few days after having emerged from the soil, and the color of the foliage is observed to be much darker (increased chlorophyll content). Whereas the action of the compounds according to the invention largely corresponds to that of CCC for wheat, a more marked reduction in growth height occurs for barley when treated with the compounds according to the invention than when treated with CCC. These observations can be confirmed by measurement of the height of the plants after a growth period of 18 days. 100 plants are measured from each of the rows treated.

Result of the height measurement:

| Active ingredient | Treatment rate, mg. of active ingredient per dish | Wheat plant height | | Barley plant height | |
|---|---|---|---|---|---|
|  |  | Cm. | Percent | Cm. | Percent |
| Control [1] | | 21.9 | 100 | 16.5 | 100 |
| CCC | 3 | 17.5 | 80 | 16 | 97 |
| CCC | 12 | 15.4 | 70 | 15.5 | 94 |
| I | 3 | 17.2 | 79 | 15.5 | 94 |
| I | 12 | 15.5 | 71 | 15.0 | 91 |
| II | 3 | 17.2 | 79 | 15.5 | 94 |
| II | 12 | 15.9 | 73 | 14.5 | 88 |
| III | 3 | 17.8 | 81 | 16 | 97 |
| III | 12 | 16.4 | 75 | 13.5 | 82 |

[1] Untreated.

We claim:
1. A compound of the formula

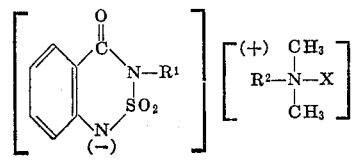

in which $R^1$ denotes a lower alkyl radical or a $C_5$–$C_7$ cycloalkyl radical, $R^2$ denotes a β-haloethyl, an isopropyl, a sec-butyl or a 2-chloroallyl or an allyl radical and X denotes a methyl group or an amino group.

* * * * *